US012806924B2

(12) United States Patent
Ando

(10) Patent No.: US 12,806,924 B2
(45) Date of Patent: Nov. 24, 2026

(54) CUTTING DEVICE AND PRINTER

(71) Applicant: Toshiba Tec Kabushiki Kaisha, Tokyo (JP)

(72) Inventor: Koichi Ando, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 234 days.

(21) Appl. No.: 18/740,440

(22) Filed: Jun. 11, 2024

(65) Prior Publication Data

US 2025/0153493 A1 May 15, 2025

(30) Foreign Application Priority Data

Nov. 10, 2023 (JP) ................................ 2023-192072

(51) Int. Cl.
*B41J 11/66* (2006.01)
*B26D 1/38* (2006.01)
*B41J 2/32* (2006.01)
*B41J 3/407* (2006.01)
*B41J 11/70* (2006.01)
*B41J 13/10* (2006.01)
*B65H 35/06* (2006.01)

(52) U.S. Cl.
CPC ............... *B41J 11/706* (2013.01); *B41J 2/32* (2013.01); *B41J 3/4075* (2013.01); *B41J 3/4078* (2013.01); *B41J 13/106* (2013.01); *B65H 35/06* (2013.01); *B65H 2301/5133* (2013.01)

(58) Field of Classification Search
None
See application file for complete search history.

(56) References Cited

U.S. PATENT DOCUMENTS 4,617,577 A * 10/1986 Takahashi ................ B41J 17/04 347/215
5,079,980 A 1/1992 Oakes
2006/0061030 A1* 3/2006 Kaneko .................... B26D 1/08 270/52.17

FOREIGN PATENT DOCUMENTS

EP 2338689 A2 * 6/2011 .............. B41J 5/042
JP S51-17846 A 2/1976
JP S54-156891 A 12/1979
JP S58-197151 A 11/1983
JP S59-50697 U 4/1984

(Continued)

OTHER PUBLICATIONS

English language translation of JP 2015-101065 A, publication date Jun. 4, 2015. (Year: 2015).*

(Continued)

*Primary Examiner* — Leslie J Thompson
(74) *Attorney, Agent, or Firm* — Kim & Stewart LLP

(57) ABSTRACT

A cutting device for cutting a cloth medium includes a cutter including a fixed blade above a conveyance path along which the cloth medium is conveyed and a movable blade below the conveyance path, the movable blade being movable upward to cut the cloth medium between the fixed blade and the movable blade, and a guide disposed above the conveyance path and downstream of the cutter in a conveyance direction in which the cloth medium is conveyed along the conveyance path, the guide guiding the cloth medium having passed between the fixed blade and the movable blade in the conveyance direction. The guide is movable in a vertical direction in conjunction with the movable blade.

18 Claims, 11 Drawing Sheets

(56) References Cited

FOREIGN PATENT DOCUMENTS

| | | | | |
|---|---|---|---|---|
| JP | H03166982 | A | * | 7/1991 |
| JP | H09-136290 | A | | 5/1997 |
| JP | 2009-292605 | A | | 12/2009 |
| JP | 4559647 | B2 | | 10/2010 |
| JP | 2015101065 | A | * | 6/2015 |

OTHER PUBLICATIONS

English language translation of JP H03166982 A, publication date Jul. 18, 1991. (Year: 1991).*

Notice of Reasons for Refusal mailed Mar. 3, 2026 in corresponding Japanese Patent Application No. 2023-192072, 12 pages (with translation).

* cited by examiner

CUTTING DEVICE AND PRINTER

CROSS-REFERENCE TO RELATED APPLICATION

This application is based upon and claims the benefit of priority from Japanese Patent Application No. 2023-192072, filed Nov. 10, 2023, the entire contents of which are incorporated herein by reference.

FIELD

Embodiments described herein relate generally to a cutting device and a printer.

BACKGROUND

There is a known printer device that performs printing on a long paper medium (hereinafter also referred to as a paper label). Such a printer device includes a cutting device having a cutter mechanism for cutting off a portion of the paper medium on which printing has been performed.

Furthermore, as a medium other than the paper label described above, a long cloth medium (hereinafter also referred to as a cloth label) formed of a material, such as polyester, is known. With the above-described printer device, for example, a care label to be attached to clothes or the like can be created by printing quality information of, for example, clothes on a cloth label, cutting off a portion of the cloth label on which printing has been performed, and discharging the cut-off portion from a discharge port.

Here, a cloth label tends to curl during printing. For example, in a printer device that performs printing using a thermal head and a platen roller, when a cloth label passes between the thermal head and the platen roller, the cloth label is rubbed by the thermal head and caused to curl. Also, cloth labels are softer than paper labels. For this reason, when the leading end of a curled cloth label is caught in a conveyance path, the cloth label is more likely to be rolled compared with a paper label and may clog the conveyance path.

A technology related to a stacker for stacking and storing care labels has been proposed. However, because the related-art technology does not give any consideration to the conveyance of a curled cloth label, it is difficult to solve the above-described problem with the related-art technology.

SUMMARY OF THE INVENTION

Embodiments of the present invention provide a cutting device and a printer capable of efficiently conveying a cloth label.

According to an aspect of the present disclosure, a cutting device for cutting a cloth medium, comprises a cutter including a fixed blade above a conveyance path along which the cloth medium is conveyed and a movable blade below the conveyance path, the movable blade being movable upward to cut the cloth medium between the fixed blade and the movable blade; and a guide disposed above the conveyance path and downstream of the cutter in a conveyance direction in which the cloth medium is conveyed along the conveyance path, the guide guiding the cloth medium having passed between the fixed blade and the movable blade in the conveyance direction. The guide is movable in a vertical direction in conjunction with the movable blade.

DETAILED DESCRIPTION

Hereinafter, embodiments will be described in detail with reference to the drawings. The present invention is not limited to the embodiments described below.

Figure 1:
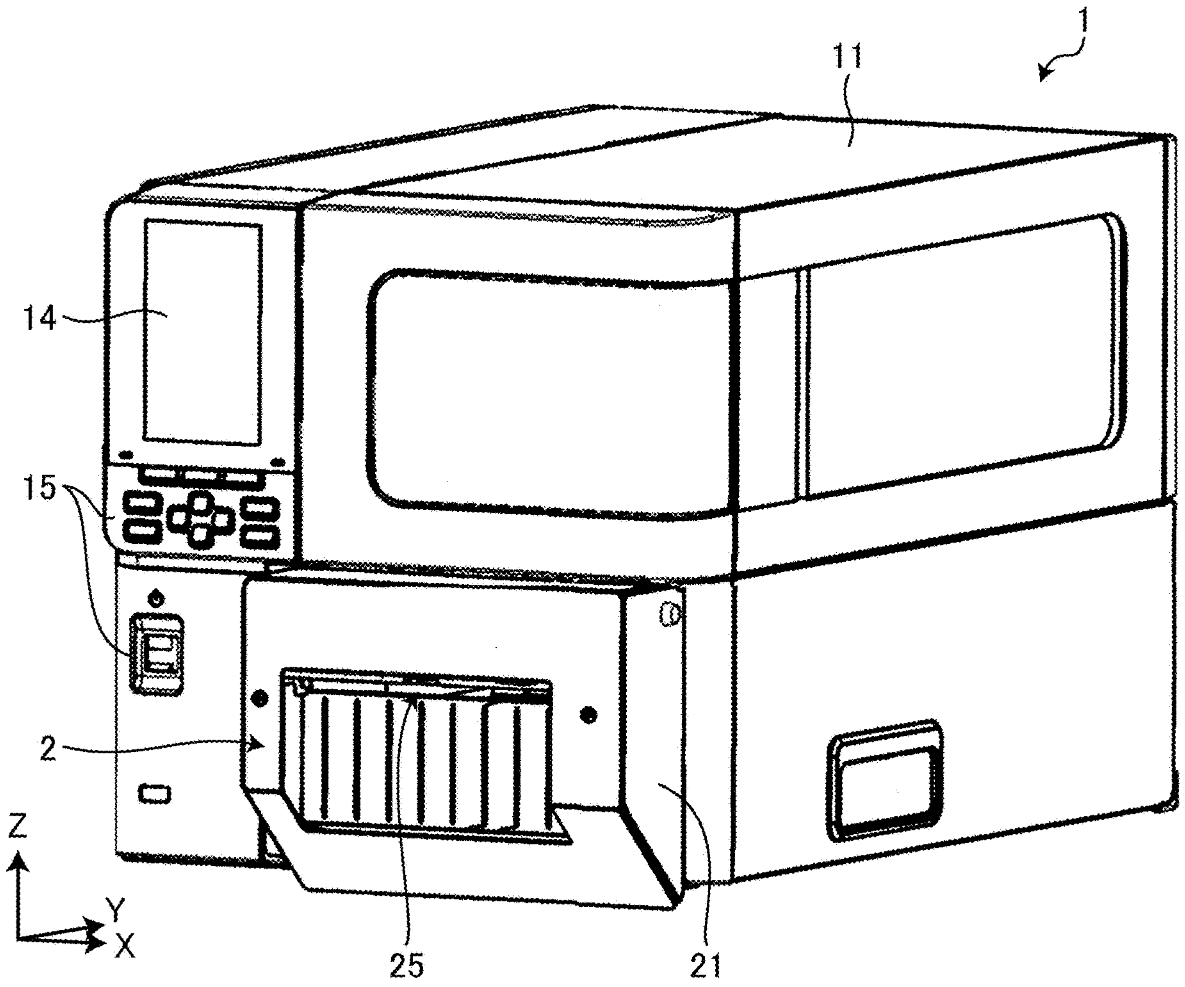
FIG. 1 is an external perspective view of a printer and a cutting device according to an embodiment.
Figure 2:
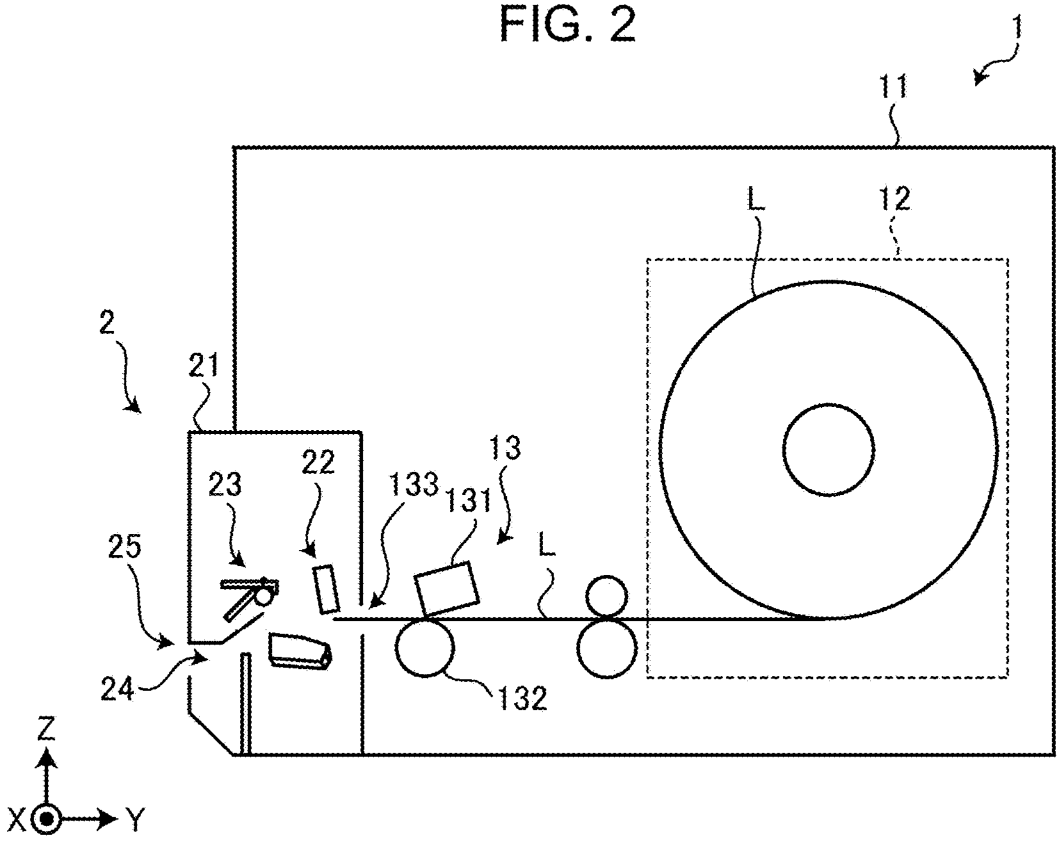
FIG. 2 is a diagram illustrating internal configurations of the printer and the cutting device according to the embodiment.

FIG. 1 is an external perspective view of a printer and a cutting device according to an embodiment. FIG. 2 is a diagram illustrating internal configurations of the printer and the cutting device according to the embodiment.

Below, configurations of a printer 1 and a cutting device 2 will be described using directions represented by an X-axis, a Y-axis, and a Z-axis that are orthogonal to each other. The X-axis passes through the printer 1 from the left side to the right side of the printer 1. The Y-axis passes through the printer 1 from the front side to the rear side of the printer 1. The Z-axis passes through the printer 1 from the lower side to the upper side of the printer 1. Hereinafter, the side of each of the printer 1 and the cutting device 2 facing the negative Y-axis direction is referred to as a front side. The side of each of the printer 1 and the cutting device 2 facing the positive Y-axis direction is referred to as a rear side.

The printer 1 is connected by wire or wirelessly to, for example, an information processing apparatus, such as a personal computer (PC), to be able to communicate with the information processing apparatus. The printer 1 of the present embodiment issues a care label by performing printing on a cloth label L.

The printer 1 includes a housing 11, a medium holder 12, a printing unit 13, a display unit 14, and an operation unit 15.

The housing 11 has a substantially box shape and houses the medium holder 12 and the printing unit 13. In addition, the housing 11 houses a control unit (not shown), such as a processor, that controls the operations of the printer 1 and the cutting device 2.

The medium holder 12 holds the cloth label L wound in a roll and feeds the cloth label L. The cloth label L is a long cloth medium formed of a material such as polyester.

The printing unit 13 includes a print head 131 and a platen 132. The printing unit 13 is an example of a printing mechanism. The cloth label L fed from the medium holder 12 is inserted between the print head 131 and the platen 132, and is conveyed toward a first discharge port 133.

The print head 131 is a thermal head and performs printing on the cloth label L fed from the medium holder 12. The print head 131 may be a thermal transfer print head that performs printing using an ink ribbon (not shown) inserted between the print head 131 and the platen 132 or may be a direct thermal print head. Also, the print head 131 may be a flat thermal head a flat part of which comes into contact with the cloth label L or may be a near-edge thermal head a corner of which comes into contact with the cloth label L. The cloth label L on which printing has been performed by the print head 131 is conveyed to the cutting device 2 through the first discharge port 133.

The display unit 14 includes a display device such as a Liquid Crystal Display (LCD). The display unit 14 displays various kinds of information, such as a screen indicating the state of the printer 1 and the state of the cutting device 2, under the control of a control unit (not shown) included in the printer 1. The operation unit 15 includes various buttons related to the operation of the printer 1. For example, the operation unit 15 includes a power button, a paper feed button, and the like. The power button is an operation button for activating and deactivating the printer 1. The paper feed button is an operation button for driving, for example, a motor to feed the cloth label L in the conveyance direction.

The cutting device 2 cuts the cloth label L conveyed through the first discharge port 133 to a predetermined length. Specifically, the cutting device 2 cuts off a portion (hereinafter also referred to as a cut-off portion) of the cloth label L on which printing has been performed by the printing unit 13 and issues the cut-off portion as a care label. That is, the cutting device 2 cuts off a portion of the cloth label L that has a predetermined length and on which printing has been performed.

The cutting device 2 is disposed in a part of the printer 1 facing the first discharge port 133 and receives the cloth label L, on which printing has been performed by the printing unit 13, via the first discharge port 133. The cutting device 2 may be integrated with the printer 1 or may be detachably attached to the printer 1.

The cutting device 2 includes a cutter 22, a conveyance unit 23, and a guide unit 24 inside of a housing 21. In addition, the cutting device 2 includes a drive mechanism 3 (see FIGS. 4 to 6), which will be described later, inside of the housing 21.

The cutter 22 includes a cutting mechanism for cutting off a portion of the cloth label L on which printing has been performed by the printing unit 13. The conveyance unit 23 conveys the portion of the cloth label L cut off by the cutter 22 as a care label and discharges the care label from a second discharge port 25 provided in the housing 21. The guide unit 24 guides the conveyance of the care label cut off by the cutter 22 (that is, a cut-off portion of the cloth label L). Here, a path and a direction from the first discharge port 133 toward the second discharge port 25 are referred to, respectively, as a conveyance path and a conveyance direction of the cloth label L in the cutting device 2.

Figure 3:
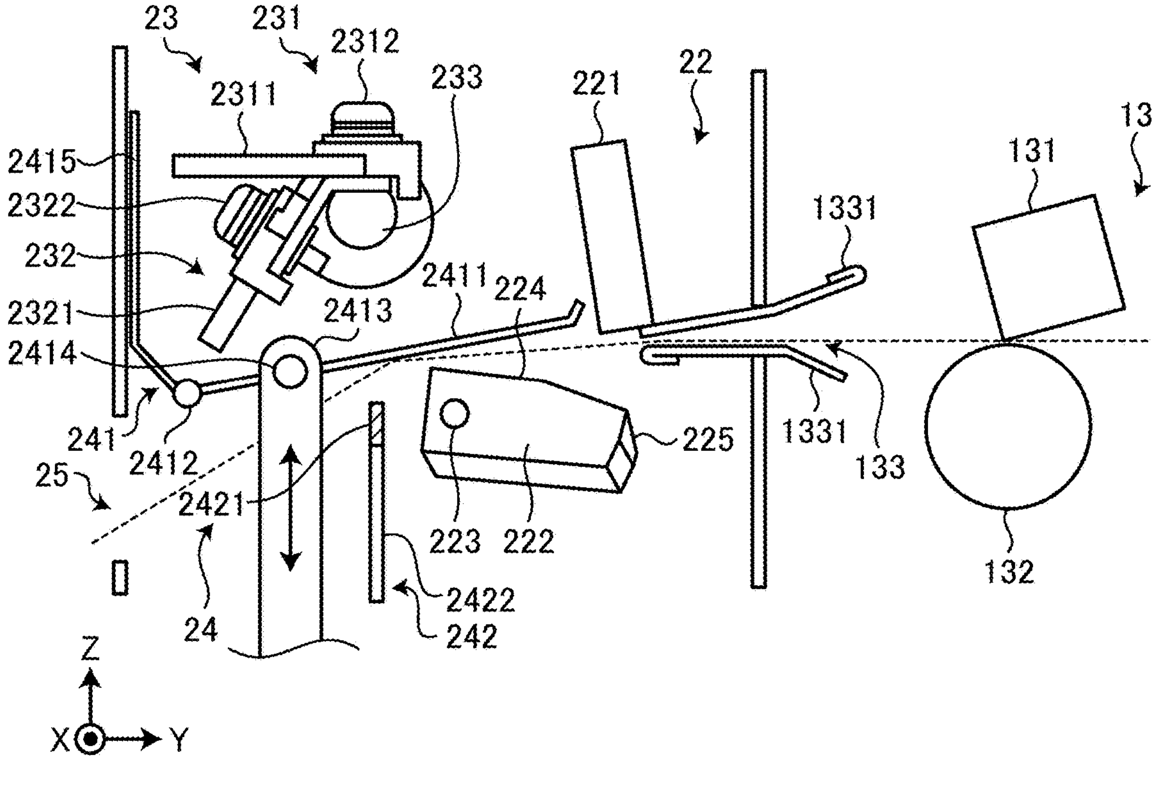
FIG. 3 is an enlarged right side view of the cutting device and a portion around the cutting device according to the embodiment.

With reference to FIG. 3, a description will be given of an internal configuration of the cutting device 2 and a portion around the cutting device 2. FIG. 3 is an enlarged right side view of the cutting device 2 and the portion around the cutting device 2. In FIG. 3, the conveyance path of the cloth label L is indicated by a broken line.

The cutter 22 includes a mechanism for cutting the cloth label L conveyed from the printing unit 13. Specifically, the cutter 22 includes a fixed blade 221 and a movable blade 222. FIG. 3 illustrates an example in which a guide member 1331 for guiding the conveyance of the cloth label L from the printing unit 13 to the cutting device 2 is provided in the first discharge port 133.

The fixed blade 221 is disposed downstream of the first discharge port 133 and above the conveyance path and has a blade facing the conveyance path at its lower end. On the other hand, the movable blade 222 is disposed below the conveyance path. The movable blade 222 is a substantially plate-shaped member extending in the width direction (or the lateral direction) of the cutting device 2. The movable blade 222 includes a support shaft 223 that extends parallel to the width direction of the cutting device 2 and is positioned eccentrically toward the downstream side in the conveyance direction (or toward the front side of the cutting device 2). The movable blade 222 is rotatable about the support shaft 223.

An upper surface 224 of the movable blade 222 serves as a platform on which a cut-off portion of the cloth label L is placed. The upper surface 224 forms a part of the conveyance path during a process of cutting the cloth label L. The upper surface 224 of the movable blade 222 may be a flat surface or may have a chevron shape as shown in FIG. 3 in consideration of the conveyance of the cloth label L. The upper surface 224 of the movable blade 222 is preferably a smooth surface to achieve smooth conveyance.

A blade (hereinafter also referred to as a blade surface 225) facing the conveyance path is provided on an upstream end face (for example, an upper end face) of the movable blade 222 in the conveyance direction (or an end face on the rear side of the cutting device 2). When the movable blade 222 is rotated about the support shaft 223, the blade surface 225 moves upward and downward with respect to the conveyance path to cut the cloth label L placed between the fixed blade 221 and the movable blade 222. That is, the position, the size, and the shape of the movable blade 222 are designed such that the blade surface 225 of the movable blade 222 passes a position at which the blade surface 225 engages the fixed blade 221 as a result of the rotation of the movable blade 222 around the support shaft 223.

The conveyance unit 23 is disposed downstream of the cutter 22 in the conveyance direction and above the conveyance path. The conveyance unit 23 performs an operation for conveying the portion of the cloth label L cut off by the cutter 22 to the second discharge port 25. Specifically, the conveyance unit 23 includes a first paddle 231, a second paddle 232, and a paddle rotation shaft 233.

The paddle rotation shaft 233 is an example of a second rotation shaft that extends in the width direction of the cutting device 2. The paddle rotation shaft 233 rotates in a clockwise direction corresponding to the conveyance direction of the cloth label L in the figures.

Each of the first paddle 231 and the second paddle 232 is an example of a paddle. The first paddle 231 and the second paddle 232 are attached to the paddle rotation shaft 233 and rotate in the clockwise direction in the figures as the paddle rotation shaft 233 rotates.

Here, the first paddle 231 and the second paddle 232 are attached to the paddle rotation shaft 233 at different attachment angles. Specifically, the first paddle 231 and the second paddle 232 are attached to the paddle rotation shaft 233 at different attachment angles such that the first paddle 231 enters the conveyance path first and then the second paddle 232 enters the conveyance path. In other words, the first paddle 231 and the second paddle 232 are attached to the paddle rotation shaft 233 at different attachment angles such that the first paddle 231 contacts the upper surface 224 of the movable blade 222 first and then the second paddle 231 contacts the upper surface 224 when the paddle rotation shaft 233 rotates. Although the difference between the attachment angles of the first paddle 231 and the second paddle 232 is not limited to any particular value, the difference between the attachment angles is preferably adjusted according to, for example, the type of the cloth label L.

The first paddle 231 includes a first paddle blade 2311 and a first fixing part 2312 for fixing the first paddle blade 2311 to the paddle rotation shaft 233. The second paddle 232 also includes a second paddle blade 2321 and a second fixing part 2322 for fixing the second paddle blade 2321 to the paddle rotation shaft 233. The first fixing part 2312 and the second fixing part 2322 are implemented by fixing members such as screws.

Each of the first paddle blade 2311 and the second paddle blade 2321 is formed of an elastic material, such as ethylene propylene diene rubber (EPDM). Also, the lengths of the first paddle blade 2311 and the second paddle blade 2321 are set such that the first paddle blade 2311 and the second paddle blade 2321 can contact the upper surface 224 of the movable blade 222 when the paddle rotation shaft 233 rotates. Here, the length of each paddle blade indicates, for example, the length from the center of the paddle rotation shaft 233 to the tip of the paddle blade and is not limited to the length of the paddle blade itself. The lengths of the first paddle blade 2311 and the second paddle blade 2321 may be the same or different from each other. In the present embodiment, it is assumed that the length of the second paddle blade 2321 is longer than the length of the first paddle blade 2311.

Figure 4:
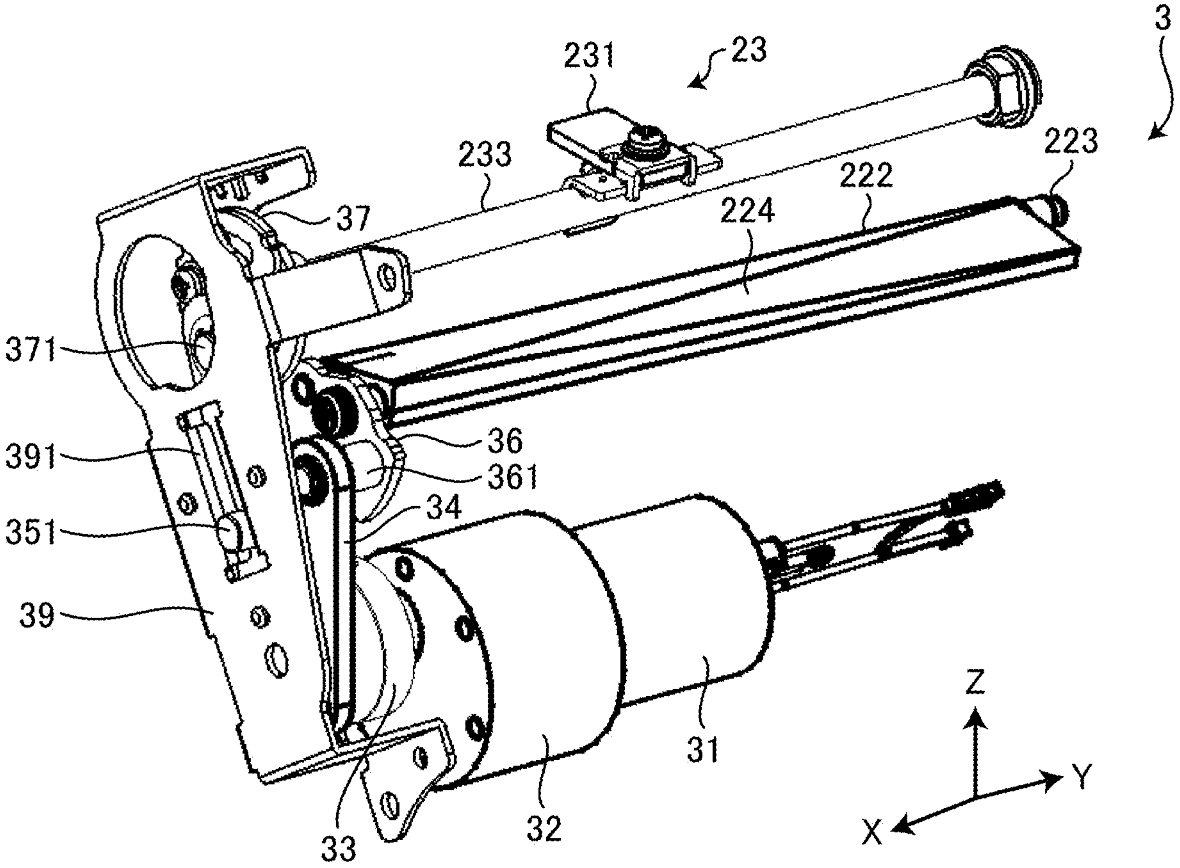
FIG. 4 is a perspective view of a drive mechanism according to the embodiment viewed from the rear side of the printer.
Figure 5:
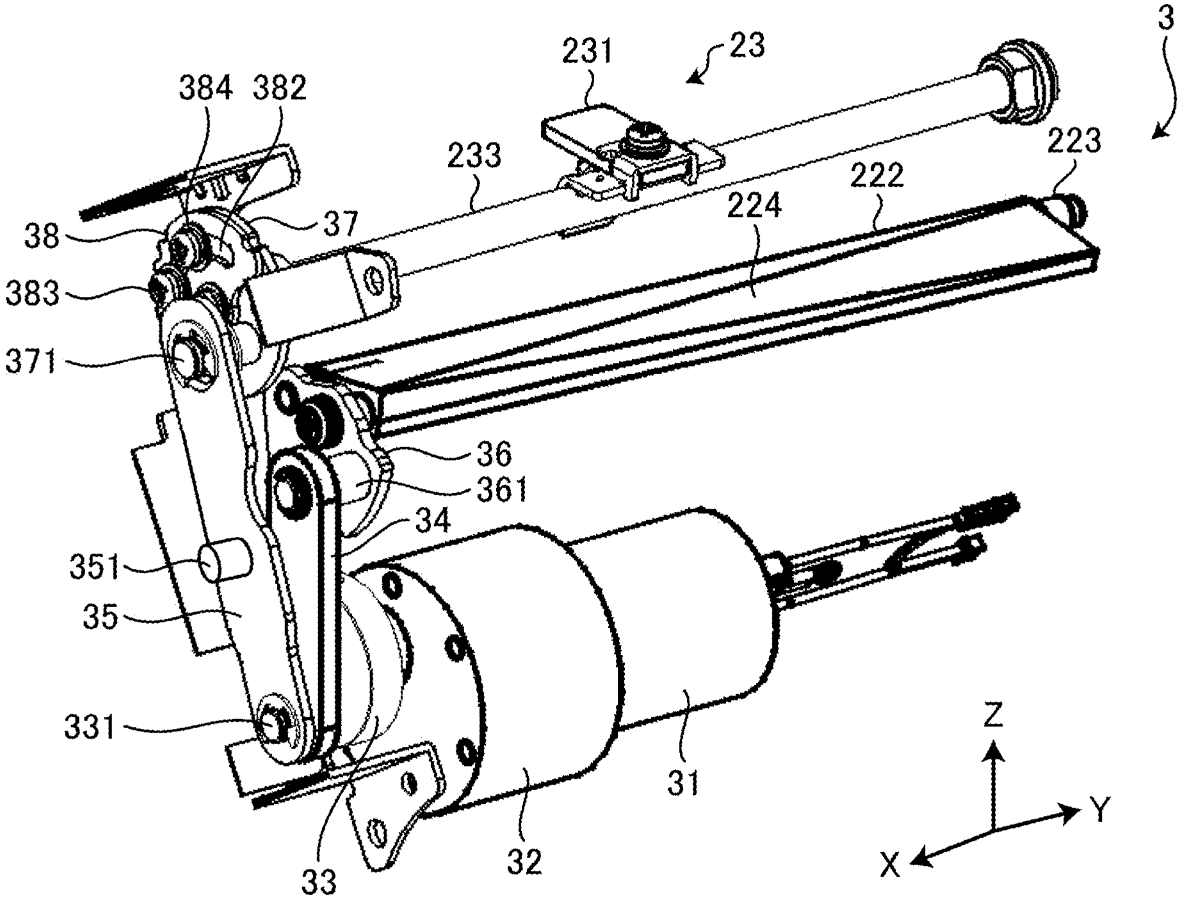
FIG. 5 is a perspective view of the drive mechanism from which a cover is removed.
Figure 6:
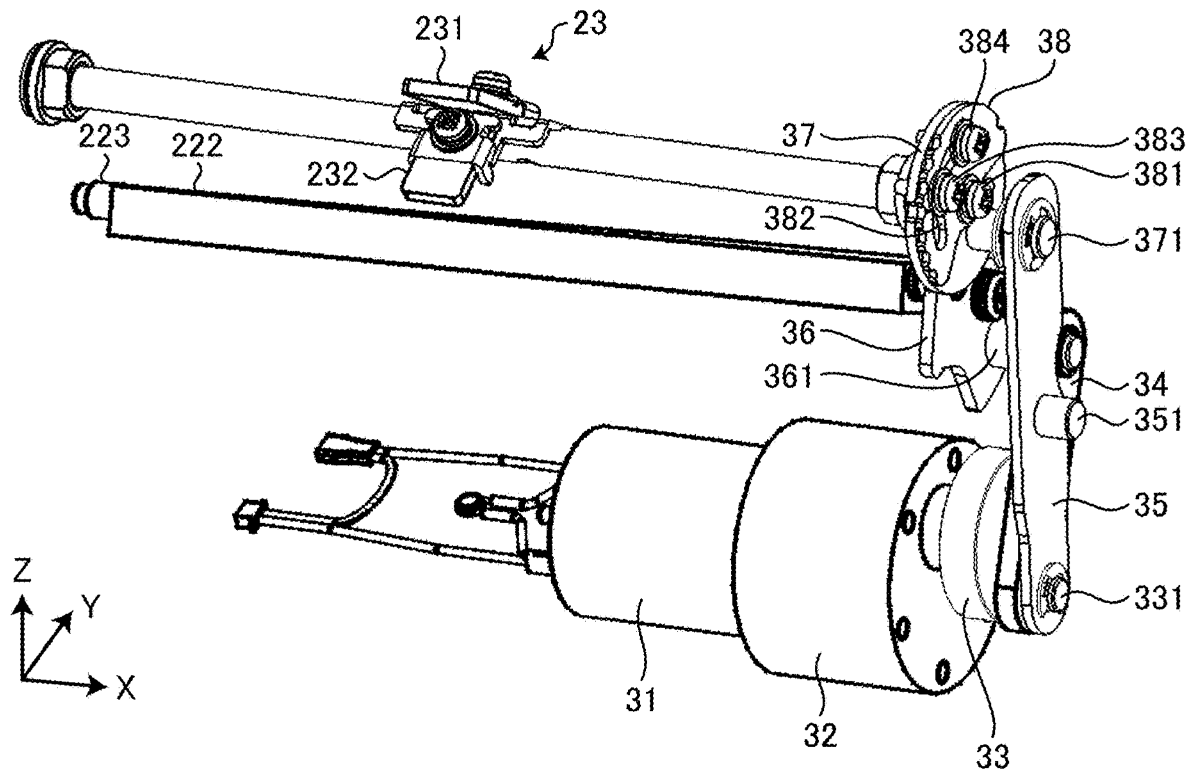
FIG. 6 is a perspective view of the drive mechanism viewed from the front side of the printer.

Also, the paddle rotation shaft 233 is configured to rotate in conjunction with the rotation of the movable blade 222. Specifically, the drive mechanism 3 (or a second drive mechanism) shown in FIGS. 4 to 6 is configured to rotate the paddle rotation shaft 233 in conjunction with the vertical rotation of the movable blade 222. The drive mechanism 3 will be described below with reference to FIGS. 4 to 6.

FIG. 4 is a perspective view of the drive mechanism 3 viewed from the rear side of the printer 1. FIG. 5 is a perspective view of the drive mechanism 3 of FIG. 4 from which a cover is removed. FIG. 6 is a perspective view of the drive mechanism 3 viewed from the front side of the printer 1.

The drive mechanism 3 is an example of a first drive mechanism and a second drive mechanism and includes a drive motor 31 serving as a drive source and a first transmission mechanism 32 that transmits the rotation of the drive motor 31 to a rotating body 33. The rotating body 33 has, for example, a disk shape and is rotated by power received from the first transmission mechanism 32. The rotating body 33 includes a drive motor shaft 331 that is positioned eccentrically with respect to the rotation center. A first link 34 and a second link 35 are connected to the drive motor shaft 331 so as to be rotatable about the drive motor shaft 331. Furthermore, a guide link 2413 (see FIG. 3), which will be described later, is connected to the drive motor shaft 331 so as to be rotatable about the drive motor shaft 331. The term "connect" used in the descriptions of the drive mechanism 3 below may be replaced with a term such as "join", "fit", or the like.

One end of the first link 34 is connected to the drive motor shaft 331, and the other end of the first link 34 is connected to a first frame 36. The first frame 36 supports one end of the movable blade 222 in the longitudinal direction. The first frame 36 supports the movable blade 222 such that the movable blade 222 is rotatable about the support shaft 223. Furthermore, the first frame 36 includes a first drive shaft 361 that is disposed upstream of the support shaft 223 in the conveyance direction. The other end of the first link 34 is connected to the first drive shaft 361 to be rotatable about the first drive shaft 361.

In the above-described configuration, the first link 34 turns (swings) the first frame 36 up and down around the support shaft 223 by converting the rotational motion of the rotating body 33 into a reciprocating motion and transmitting the reciprocating motion to the first frame 36.

One end of the second link 35 is connected to the drive motor shaft 331, and the other end of the second link 35 is connected to a second frame 37. The second frame 37 is a flange-shaped support for supporting one end of the paddle rotation shaft 233 and is integrally connected to the paddle rotation shaft 233 via a paddle angle adjustment plate 38.

The paddle angle adjustment plate 38 is formed of a semicircular plate-like member. The paddle angle adjustment plate 38 is fixed to one end of the paddle rotation shaft 233 with a shaft fixing screw 381 and is disposed on a surface of the second frame 37 facing the second link 35. Here, the paddle rotation shaft 233 is located at the center of the arc of the paddle angle adjustment plate 38.

In addition, the paddle angle adjustment plate 38 has a long hole 382 that has an arc shape centered on the paddle rotation shaft 233 and surrounds screw holes 372 and 373 (see FIG. 7) formed in the second frame 37. The paddle angle adjustment plate 38 and the second frame 37 are joined together by screwing adjustment plate fixing screws 383 and 384 into the screw holes 372 and 373 via the long hole 382. That is, the second frame 37 and the paddle rotation shaft 233 are integrated with each other.

The arc length of the long hole 382 is greater than the length between the screw holes 372 and 373, in other words, the arc length between the screw holes 372 and 373 centered on the center of the paddle angle adjustment plate 38. This makes it possible to insert the adjustment plate fixing screws 383 and 384 into the screw holes 372 and 373 via the long hole 382 even when the paddle angle adjustment plate 38 is moved (rotated) around the paddle rotation shaft 233.

By attaching the paddle angle adjustment plate 38 to the second frame 37 via the long hole 382 as described above, it is possible to adjust the rotational position of the paddle rotation shaft 233 when attaching the paddle rotation shaft 233 to the second frame 37. That is, it is possible to adjust the timing at which each of the first paddle 231 and the second paddle 232 reaches the upper surface 224 (or the platform) of the movable blade 222 when the paddle rotation shaft 233 is rotated.

Further, the second frame 37 includes a second drive shaft 371 disposed eccentrically with respect to the rotation center. The other end of the second link 35 is connected to the second drive shaft 371 so as to be rotatable about the second drive shaft 371. A protruding slide shaft 351 is provided on an outer surface of the second link 35.

The slide shaft 351 of the second link 35 is fitted into a slit 391 formed in a cover 39 covering the first link 34 and the second link 35. The slit 391 is formed along the longitudinal direction of the second link 35 and guides the movement of the slide shaft 351 in the longitudinal direction, that is, guides the movement of the second link 35.

In the above-described configuration, the second link 35 converts the rotational motion of the rotating body 33 into a reciprocating motion, slides along the slit 391 of the cover 39, and thereby transmits power for rotating the paddle rotation shaft 233 to the second frame 37. With this configuration, the first paddle 231 and the second paddle 232 rotate in the conveyance direction along with the rotation of the paddle rotation shaft 233 and thereby perform an operation of sweeping out the cloth label L in the conveyance direction.

Figure 7:
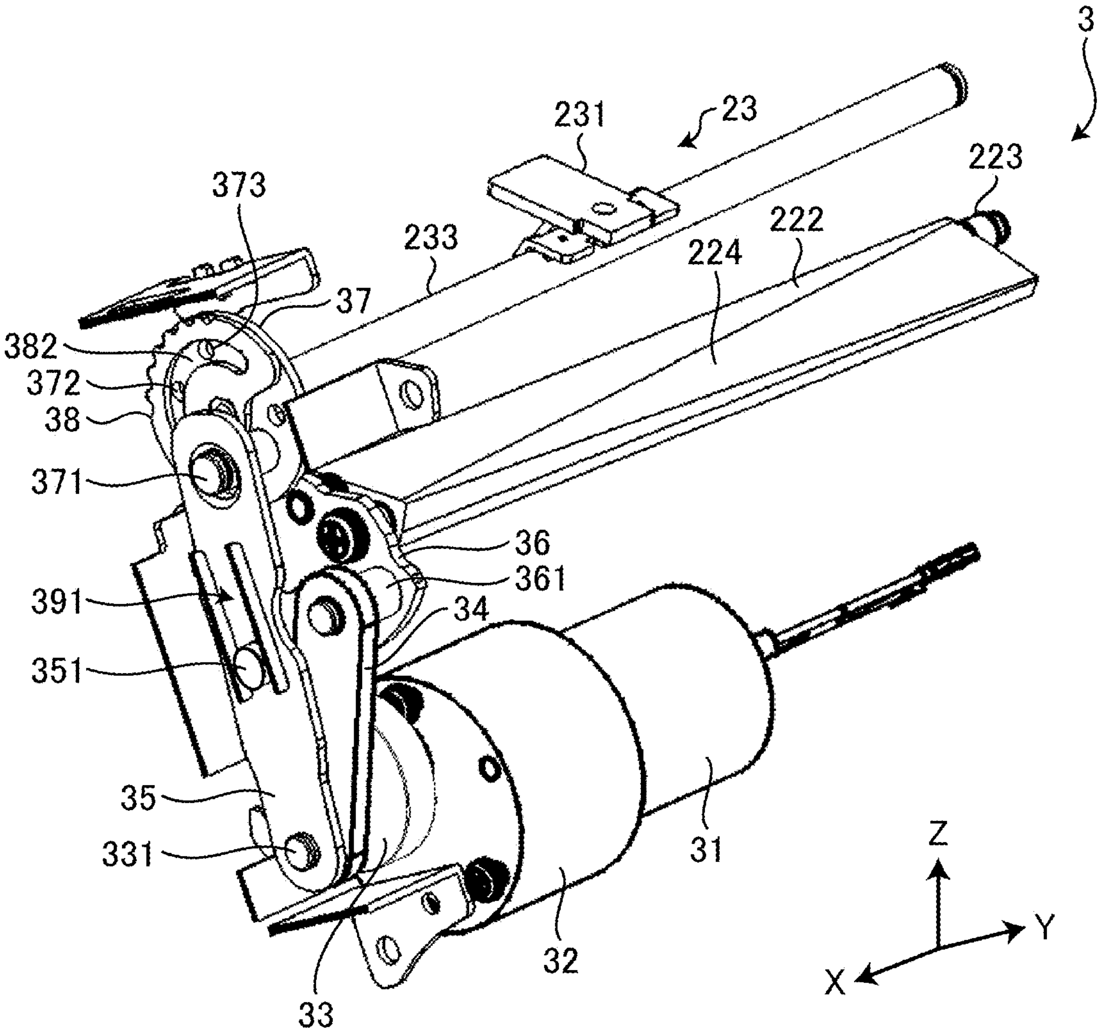
FIG. 7 is a diagram for explaining an operation of the drive mechanism according to the embodiment.
Figure 8:
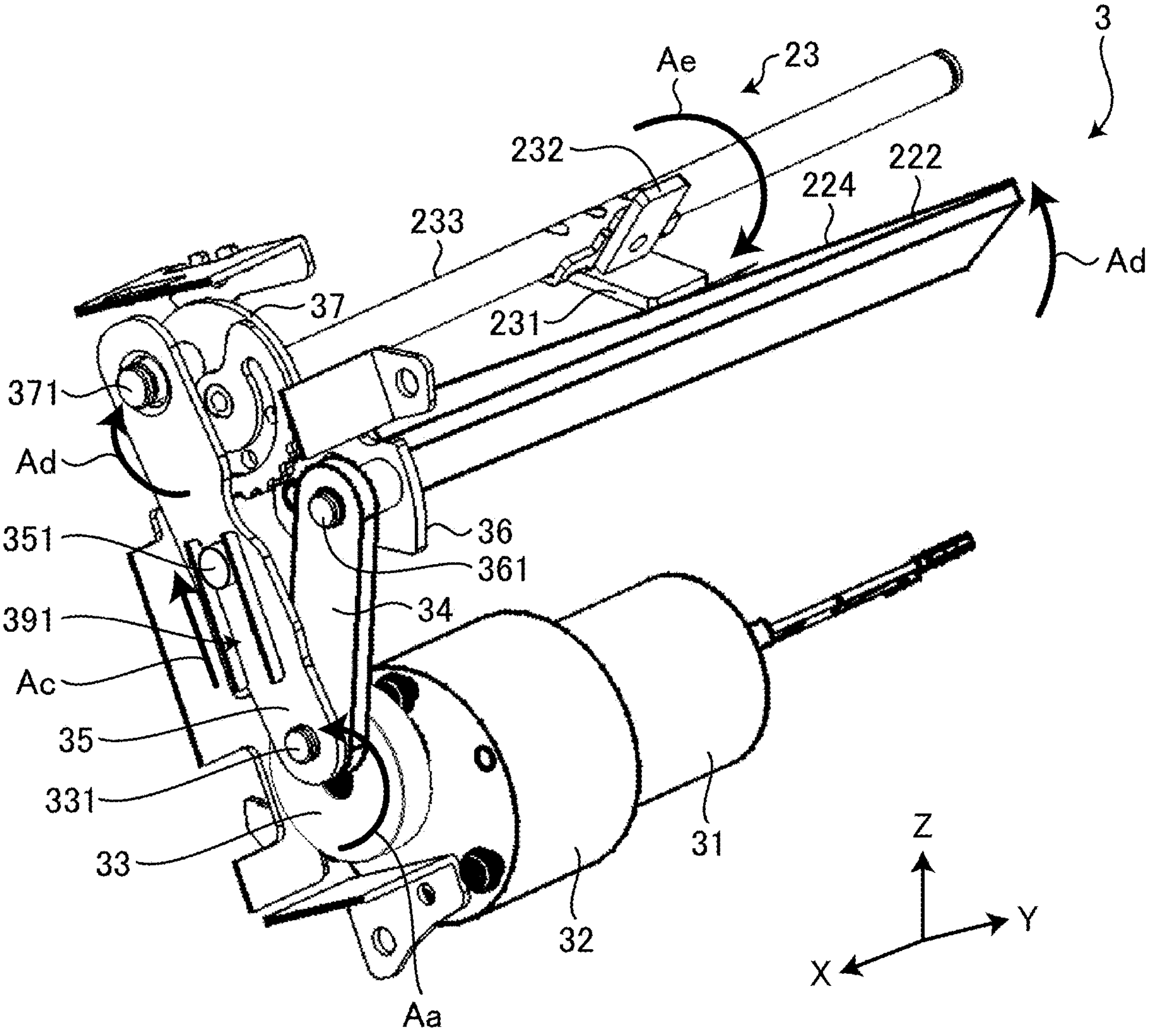
FIG. 8 is a diagram for explaining an operation of the drive mechanism according to the embodiment.
Figure 9:
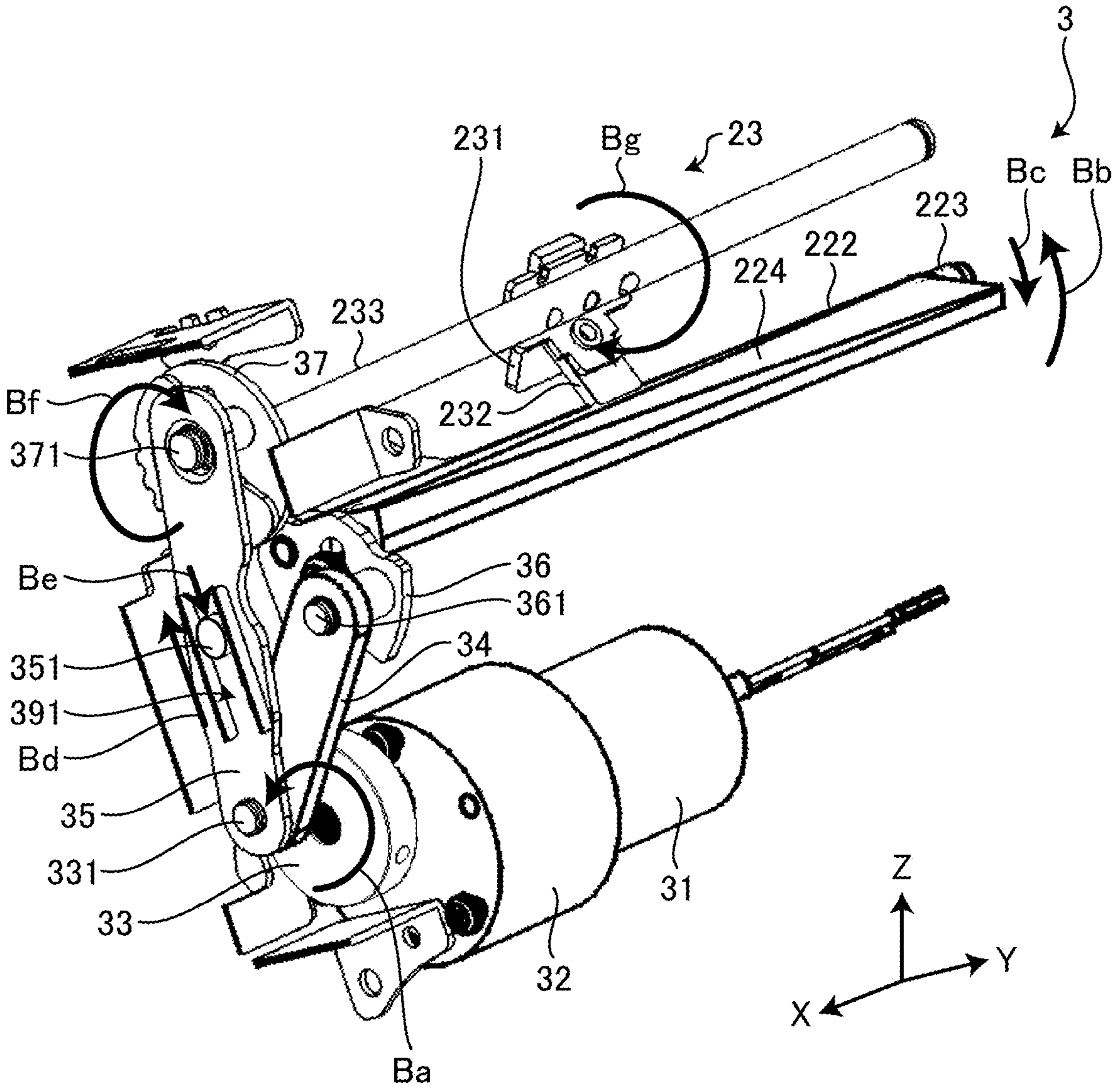
FIG. 9 is a diagram for explaining an operation of the drive mechanism according to the embodiment.

Next, synchronous driving of the movable blade 222 and the conveyance unit 23 by the drive mechanism 3 will be described with reference to FIGS. 7 to 9. FIG. 7 to FIG. 9 are diagrams for explaining the operation of the drive mechanism 3 and show the drive mechanism 3 viewed from the rear side of the printer 1. In FIG. 7 to FIG. 9, the shaft fixing screw 381, the adjustment plate fixing screws 383 and 384, and the cover 39 are not shown. The slit 391 provided in the cover 39 is illustrated.

FIG. 7 is a diagram illustrating the drive mechanism 3 in a standby state. Here, the standby state indicates a state before the movable blade 222 moves upward. Specifically, the standby state indicates, in addition to a state until the cloth label Lis conveyed from the printing unit 13, a state after a portion of the cloth label L is cut off and before the cutting of the next portion of the cloth label L is started. Hereinafter, the positions of components in the standby state illustrated in FIG. 7 are also referred to as standby positions.

Here, it is assumed that the driving of the drive motor 31 is performed in synchronization with the conveyance of the cloth label L from the printing unit 13 under the control of a control unit (not shown) included in the printer 1.

In the drive mechanism 3 in the standby state, when a predetermined length of the cloth label L is conveyed from the printing unit 13 and the conveyance of the cloth label L is stopped, the drive motor 31 is driven to rotate the rotating body 33 in the direction of an arrow Aa as shown in FIG. 8. As the rotating body 33 rotates, power is transmitted to the first link 34. As a result, the first frame 36 rotates around the support shaft 223, and the movable blade 222 moves in the direction of an arrow Ad. Also, as the rotating body 33 rotates, power is transmitted to the second link 35. As a result, the second link 35 moves along the slit 391 in the direction of an arrow Ac and rotates the second frame 37 in the direction of an arrow Ad. Accordingly, the first paddle 231 and the second paddle 232 rotate around the paddle rotating shaft 233, that is, in the direction of an arrow Ae. Note that the arrows indicate the movement directions and the movement amounts from the standby positions of the corresponding components.

Here, the trailing end of the cloth label L existing between the fixed blade 221 and the movable blade 222 is cut by moving the movable blade 222 in the direction of the arrow Ad. Also, as a result of the rotation of the paddle rotation shaft 233 in the direction of the arrow Ae, the tip of the first paddle 231 (or the first paddle blade 2311) contacts the upper surface 224 of the movable blade 222.

Subsequently, when the driving of the drive motor 31 is continued and the rotating body 33 is rotated to a position indicated by an arrow Ba shown in FIG. 9, the movement direction of the movable blade 222 changes from a direction indicated by an arrow Bb to a direction indicated by an arrow Bc. Also, the movement direction of the second link 35 along the slit 391 changes from a direction indicated by an arrow Bd to a direction indicated by an arrow Be. As a result, the second frame 37 rotates to a position indicated by an arrow Bf. Accordingly, the first paddle 231 and the second paddle 232 continue to rotate around the paddle rotation shaft 233 in a direction indicated by an arrow Bg.

Here, as a result of the change in the movement direction of the movable blade 222 from the direction indicated by the arrow Bb to the direction indicated by the arrow Bc, a part of the cut-off portion of the cloth label L, that is, a part of a care label, is placed on the upper surface 224 of the movable blade 222. Also, as a result of the rotation of the paddle rotation shaft 233 in the direction of the arrow Bg, the tip of the first paddle 231 moves along the upper surface 224 of the movable blade 222 in the conveyance direction, and then the tip of the second paddle 232 contacts the upper surface 224 of the movable blade 222.

Then, after FIG. 9, the driving of the drive motor 31 is continued, and each component of the drive mechanism 3 moves to the standby position. As a result, the tip of the second paddle 232 moves along the upper surface 224 of the movable blade 222 in the conveyance direction.

As described above, the drive mechanism 3 drives the movable blade 222 to cut a leading end portion of the printed cloth label L. Also, the drive mechanism 3 rotates the paddle rotation shaft 233 in the conveyance direction in conjunction with the driving of the movable blade 222, and thereby rotates the first paddle 231 and the second paddle 232 around the paddle rotation shaft 233.

Referring back to FIG. 3, the configuration of the cutting device 2 will be described. The cutting device 2 includes a guide unit 24 for guiding the conveyance of a portion of the cloth label L cut off by the cutter 22. Specifically, the guide unit 24 includes an upper guide 241 and a lower guide 242.

The upper guide 241 is an example of a guide in the present embodiment. The upper guide 241 is provided above the conveyance path and downstream of the cutter 22. More specifically, the upper guide 241 is provided between the upper surface 224 of the movable blade 222 and the paddle rotation shaft 233. The upper guide 241 is movable in the vertical direction in conjunction with the movable blade 222.

Specifically, the upper guide 241 includes a first guide part 2411, a rotation support 2412, a guide link 2413, a drive shaft 2414, and a support 2415.

The first guide part 2411 is a plate-like part that extends in the conveyance direction of the conveyance path. Specifically, the first guide part 2411 extends from the downstream side of the fixed blade 221 to the second discharge port 25. A downstream end of the first guide part 2411 in the conveyance direction is supported by the rotation support 2412, and an upstream end of the first guide part 2411 in the conveyance direction is a free end. As will be described later, the first guide part 2411 is configured to be rotatable in the vertical direction about the rotation support 2412.

The first guide part 2411 is made of a conductive material such as metal. In addition, it is assumed that an interference avoidance window is formed in the first guide part 2411 to prevent interference with the rotation of the paddles of the conveyance unit 23.

A drive shaft 2414 is provided on a lateral side of the first guide part 2411, and the guide link 2413 is connected to the first guide part 2411 via the drive shaft 2414. In the present embodiment, the drive shaft 2414 is provided on one lateral side of the first guide part 2411. However, the present invention is not limited to this embodiment, and the drive shaft 2414 may be provided on each lateral side of the first guide part 2411.

The rotation support 2412 is an example of a first rotation shaft. The rotation support 2412 is provided, for example, in the vicinity of the second discharge port 25. The rotation support 2412 includes a support shaft extending parallel to the width direction of the cutting device 2 and supports the first guide part 2411 such that the first guide part 2411 is rotatable around the support shaft. For example, the rotation support 2412 is implemented by a hinge.

The guide link 2413 is a link mechanism for transmitting the driving force of the drive mechanism 3 to the first guide part 2411. Specifically, one end (the lower end) of the guide link 2413 is connected to the first guide part 2411 via the drive shaft 2414 so as to be rotatable about the drive shaft 2414. The other end (the upper end) of the guide link 2413 is connected to the drive motor shaft 331 of the drive mechanism 3 described above. Together with the drive mechanism 3, the guide link 2413 functions as an example of a first drive mechanism.

The support 2415 is a support member for supporting the rotation support 2412. For example, as shown in FIG. 3, a part of the support 2415 is joined to the inner wall of the housing 21 above the second discharge port 25, and the lower end of the support 2415 is bent toward the inside of the housing 21. The rotation support 2412 is joined to the lower end of the support 2415 and is supported by the support 2415 at a position above the conveyance path and near the second discharge port 25. Note that the configuration of the support 2415 is not limited to this example.

In the above-described configuration of the upper guide 241, the guide link 2413 converts the rotational motion of the rotating body 33 into a reciprocating motion in the vertical direction. The guide link 2413 transmits the driving force in the vertical direction to the first guide part 2411. As described above, since the downstream end of the first guide part 2411 in the conveyance direction is supported by the rotation support 2412, the upstream end of the first guide part 2411 in the conveyance direction moves up and down with the rotation support 2412 as a fulcrum in accordance with the movement of the guide link 2413. That is, the first guide part 2411 rotates in the vertical direction in conjunction with the operation of cutting the cloth label L by the cutter 22 and the operation of conveying the cloth label L by the conveyance unit 23.

On the other hand, the lower guide 242 is provided below the conveyance path and below the conveyance unit 23. Specifically, the lower guide 242 is provided substantially below the paddle rotation shaft 233 in the vertical direction.

The lower guide 242 includes a static elimination brush 2421 and a support 2422. The static elimination brush 2421 is an example of a static eliminator. The static elimination brush 2421 is disposed to face upward and removes static electricity from the cloth label L conveyed in the conveyance path. The support 2422 is a support member that supports the static elimination brush 2421 from below.

The lower guide 242 guides the conveyance of the cloth label L in the conveyance path to the second discharge port 25 by supporting, from below, the cloth label L that is swept out from the upper surface 224 of the movable blade 222 by the conveyance unit 23. Here, the height of the lower guide 242, that is, the height of the static elimination brush 2421, is set so that the static elimination brush 2421 can contact the first paddle 231 and the second paddle 232. The height of the static elimination brush 2421 is set based on the relationship with the upper surface 224 of the movable blade 222 as described later.

The configurations of the printer 1 and the cutting device 2 are not limited to those described above. For example, the printer 1 may include various sensors and a driving source for rotating the platen 132. Also, the cutting device 2 may include an interface for electric connection with the printer 1.

Next, an example of an operation of the cutting device 2 will be described with reference to FIGS. 10 to 14. Here, FIGS. 10 to 14 are diagrams for explaining the operation of the cutting device 2. FIG. 10 to FIG. 14 are cross-sectional right side views of a portion including the cutter 22, the conveyance unit 23, and the guide unit 24. In FIG. 10 to FIG. 14, the guide link 2413 and the drive shaft 2414 are omitted.

After printing is performed on the cloth label L in the printing unit 13, the cloth label L is conveyed into the cutting device 2 through the first discharge port 133. Then, the cloth label L passes between the fixed blade 221 and the movable blade 222 and is fed toward the second discharge port 25 while being guided by the upper guide 241. When a predetermined length of the cloth label L is fed into the cutting device 2, the conveyance of the cloth label L is stopped.

Figure 10:
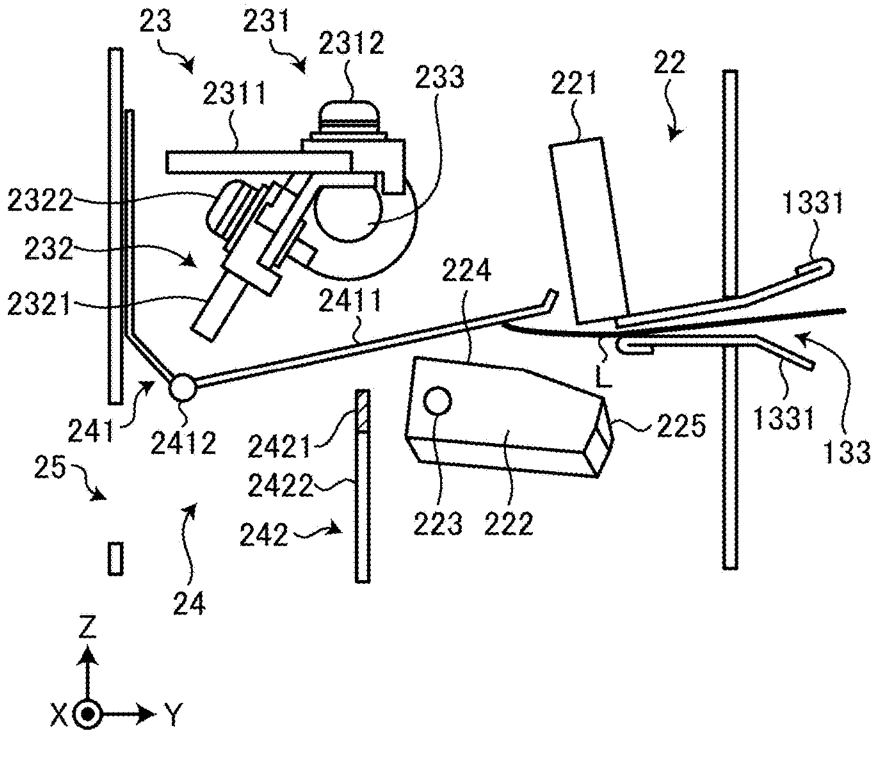
FIG. 10 is a diagram for explaining an operation of the cutting device according to the embodiment.

FIG. 10 shows a state in which a predetermined length of the cloth label L is conveyed from the printing unit 13 to the cutting device 2, and then the conveyance of the cloth label L is stopped. In this state, it is assumed that the movable blade 222, the first paddle 231, and the second paddle 232 are in the above-described standby positions. Also, it is assumed that the guide link 2413 is adjusted such that the upstream end of the first guide part 2411 in the conveyance direction is placed in an initial position that is at a height near the lower end of the fixed blade 221.

Here, it is preferable that the angle of the first guide part 2411 in the initial position, that is, the angle formed between the first guide part 2411 and a line extending in the horizontal direction (or the Y-axis direction) from the rotation support 2412, is substantially equal to the entry angle of the cloth label L conveyed from the first discharge port 133. The gap between the upstream end of the first guide part 2411 in the initial position and the fixed blade 221 is preferably small.

With a printing method using the print head 131 and the platen 132 described above, when printing is performed on the cloth label L, the cloth label L tends to curl (warp or bend). Specifically, when the cloth label L passes between the print head 131 and the platen 132, the cloth label L is rubbed by the print head 131 and curls. Also, the degree of a curl varies depending on the type of the print head 131. For example, compared with a flat head, a near-edge head applies a higher pressure per unit area, more strongly rubs the cloth label L, and therefore tends to form a tighter curl.

When the cloth label L that has passed between the print head 131 and the platen 132 is conveyed from the first discharge port 133 as shown in FIG. 10, the cloth label L with a tip curled upward enters the cutting device 2. Here, since the cloth label L used in the present embodiment is formed of a material such as polyester, the cloth label L is softer than a paper label. Therefore, when the curled tip is caught in the conveyance path, the cloth label L is more likely to be rolled compared with a paper label and may clog the conveyance path.

For the above reason, in the cutting device 2 of the present embodiment, immediately after the cloth label L enters the cutting device 2, the first guide part 2411 is placed in the initial position shown in FIG. 10. This makes it possible to reduce the angle (hereinafter also referred to as a contact angle) formed between the first guide part 2411 and the curled leading end of the cloth label L when the curled leading end of the cloth label L contacts the first guide part 2411. With the reduced contact angle, the leading end of the cloth label L is smoothly guided along the first guide part

2411 in the conveyance direction without being caught by the first guide part 2411. Therefore, in the cutting device 2, even when the cloth label L is curled, the cloth label L, which has not been cut off, can be smoothly fed toward the second discharge port 25.

The cloth label L is also more likely to be charged compared with a paper label. For example, in the above-described configuration, the cloth label L may be charged as a result of being rubbed (or due to friction) when the cloth label L is cut or conveyed. The charged cloth label L may stick to a component around the conveyance path due to electrostatic force, and the conveyance of the cloth label L may be hindered.

Therefore, the first guide part 2411 is preferably grounded to the housing 21 or the like via the guide link 2413, the support 2415, or the like. This makes it possible to suppress the influence of the electrostatic charge, and thereby makes it possible to prevent the cloth label L from sticking to, for example, the first guide part 2411 and to more efficiently convey the cloth label L.

Furthermore, as shown in FIG. 10, the tip of the lower guide 242 (or the static elimination brush 2421) is set at a height that is lower than the height of the end of the upper surface 224 of the movable blade 222 adjacent to the lower guide 242, that is, the height of the downstream end of the upper surface 224 in the conveyance direction, when the movable blade 222 is in the standby position (or the standby state).

Thus, the cloth label L, which has passed between the fixed blade 221 and the movable blade 222, moves toward the second discharge port 25 through a space above the lower guide 242 without interfering with the lower guide 242. Therefore, in the cutting device 2, the cloth label L, which has not been cut off, can be smoothly fed toward the second discharge port 25.

When the cloth label L is conveyed into the cutting device 2, the movable blade 222 is moved (rotated) upward (in the direction of an arrow in FIG. 11) by the above-described drive mechanism 3 to cut the cloth label L sandwiched between the movable blade 222 and the fixed blade 221. A cut-off portion of the cloth label L is placed on the upper surface 224 of the movable blade 222. At the same time, as the guide link 2413 is moved upward by the drive mechanism 3, the free end of the first guide part 2411 moves upward (in the direction of an arrow in FIG. 11).

Figure 11:
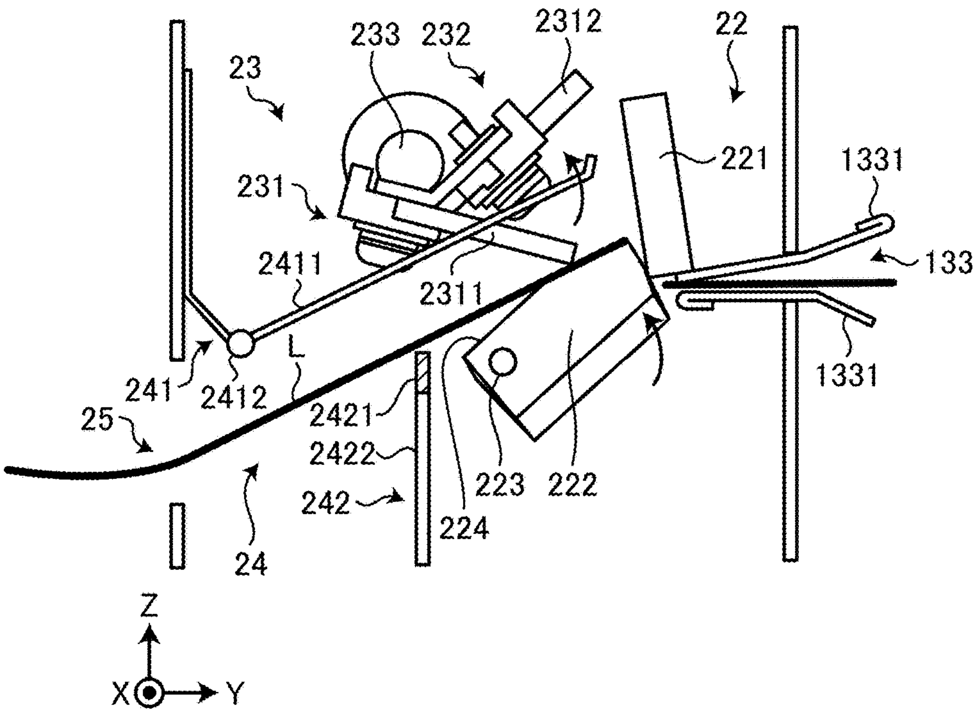
FIG. 11 is a diagram for explaining an operation of the cutting device according to the embodiment.

FIG. 11 shows a state immediately after the cloth label L is cut by the cutter 22. As shown in FIG. 11, when the movable blade 222 moves upward to cut the cloth label L, the free end of the first guide part 2411 moves upward in conjunction with the movement of the movable blade 222. Accordingly, the cutter 22 can move upward without interfering with the first guide part 2411. This configuration of the cutting device 2 of the present embodiment makes it possible to accommodate the movement range of the cutter 22.

Note that, as described above, the cloth label L is softer and more likely to be charged compared with a paper label. Since the charged cloth label L sticks to a surrounding component due to electrostatic force, it may be difficult to smoothly eject a cut-off portion of the charged cloth label L.

Therefore, the printer 1 of the present embodiment is configured such that the cloth label L can be efficiently conveyed by the rotation of the paddles of the conveyance unit 23. Specifically, as shown in FIG. 11, the paddle rotation shaft 233 rotates clockwise in conjunction with the operation of cutting the cloth label L by the movable blade 222, that is, the upward rotation of the movable blade 222. The first paddle blade 2311 of the first paddle 231 comes into contact with the upper surface 224 of the movable blade 222 as the paddle rotation shaft 233 rotates, and moves in the conveyance direction while maintaining the contact with the upper surface 224 to sweep out the cloth label L on the upper surface 224 in the conveyance direction.

Thus, for example, even when the cloth label L sticks to the upper surface 224 of the movable blade 222, the cloth label L can be conveyed (moved) toward the second discharge port 25 by the sweeping operation of the first paddle 231.

Furthermore, as shown in FIG. 11, during the cutting operation, the tip of the lower guide 242 (or the static elimination brush 2421) is set at a height higher than the height of the end of the upper surface 224 of the movable blade 222 adjacent to the lower guide 242, that is, the height of the downstream end of the upper surface 224 in the conveyance direction. Accordingly, the cloth label L is conveyed from the upper surface 224 of the movable blade 222 toward the second discharge port 25 while being in contact with the static elimination brush 2421 of the lower guide 242. Therefore, in the cutting device 2, it is possible to reliably discharge the charged cloth label L and smoothly convey the cloth label L toward the second discharge port 25.

After the cloth label L is cut, the movable blade 222 starts to move (rotate) downward (in the direction of an arrow in FIG. 12) to return to the standby position. Also, with the start of the downward movement of the movable blade 222, the drive mechanism 3 starts move the guide link 2413 downward so that the free end of the first guide part 2411 moves downward (in the direction of an arrow in FIG. 12).

On the other hand, the paddle rotation shaft 233 continues to rotate clockwise in the drawing. Therefore, while the first paddle blade 2311 is in contact with the upper surface 224 of the movable blade 222, the sweeping operation in the conveyance direction is continued.

Figure 12:
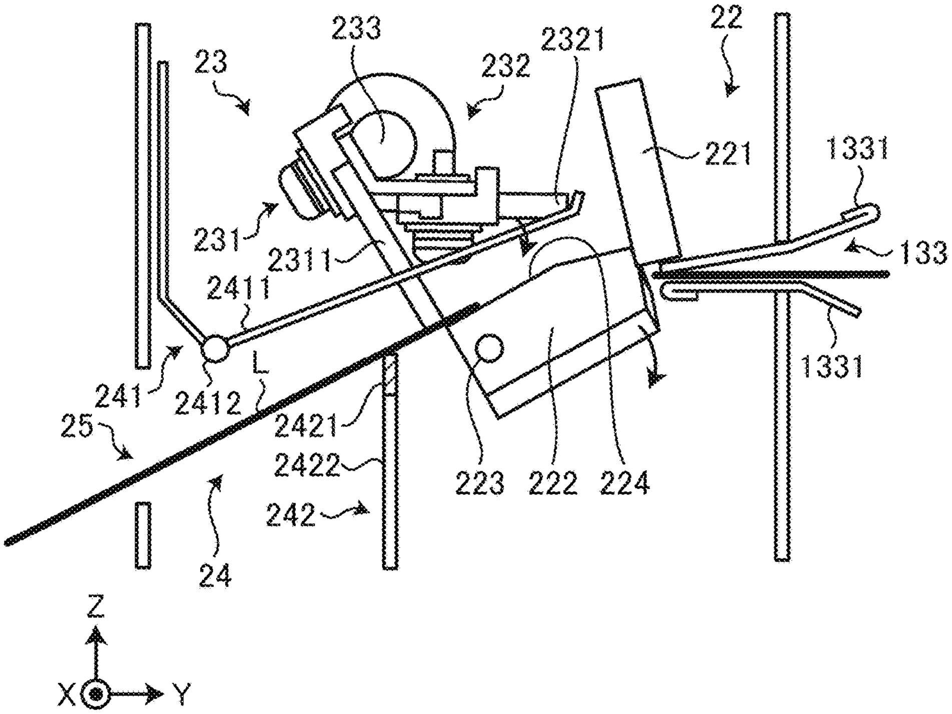
FIG. 12 is a diagram for explaining an operation of the cutting device according to the embodiment.

FIG. 12 shows the state immediately after the first paddle blade 2311 detaches from the upper surface 224 of the movable blade 222. Here, for example, due to the electrostatic force generated on the cloth label L, the trailing end of the cloth label L may stick to the upper surface 224 of the movable blade 222 and remain on the upper surface 224 even after the first paddle blade 2311 detaches from the upper surface 224. Therefore, in the present embodiment, the trailing end of the cloth label L remaining on the upper surface 224 is swept out by the second paddle 232 following the first paddle 231.

Figure 13:
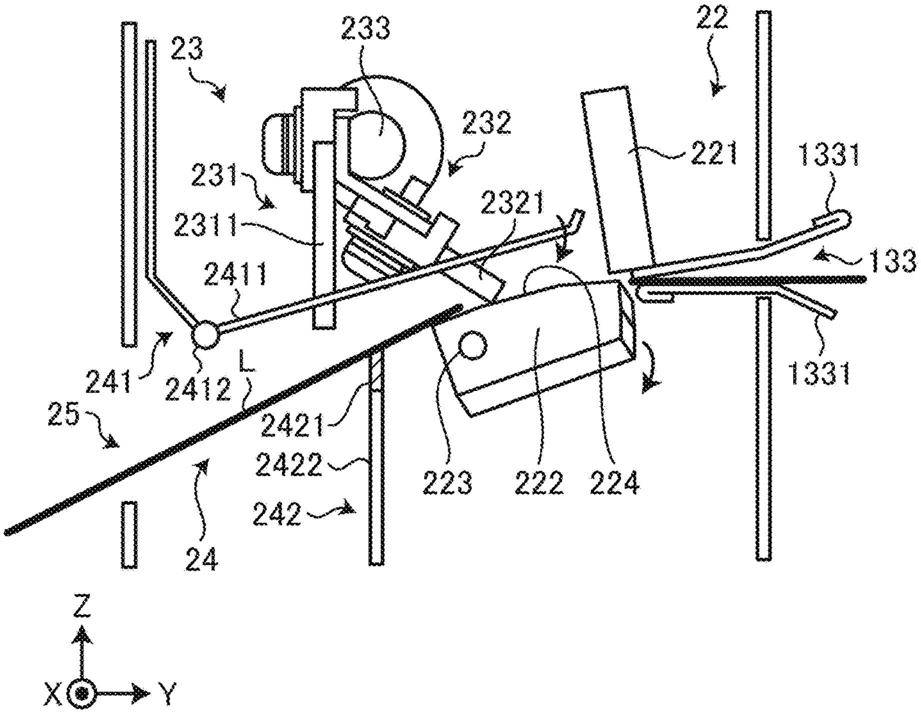
FIG. 13 is a diagram for explaining an operation of the cutting device according to the embodiment.

Specifically, as shown in FIG. 13, as the paddle rotation shaft 233 rotates clockwise, the second paddle blade 2321 of the second paddle 232 in contact with the upper surface 224 of the movable blade 222 moves along the upper surface 224 in the conveyance direction. Accordingly, the second paddle 232 starts sweeping out the trailing end of the cloth label L remaining on the upper surface 224 of the movable blade 222 in the conveyance direction.

Figure 14:
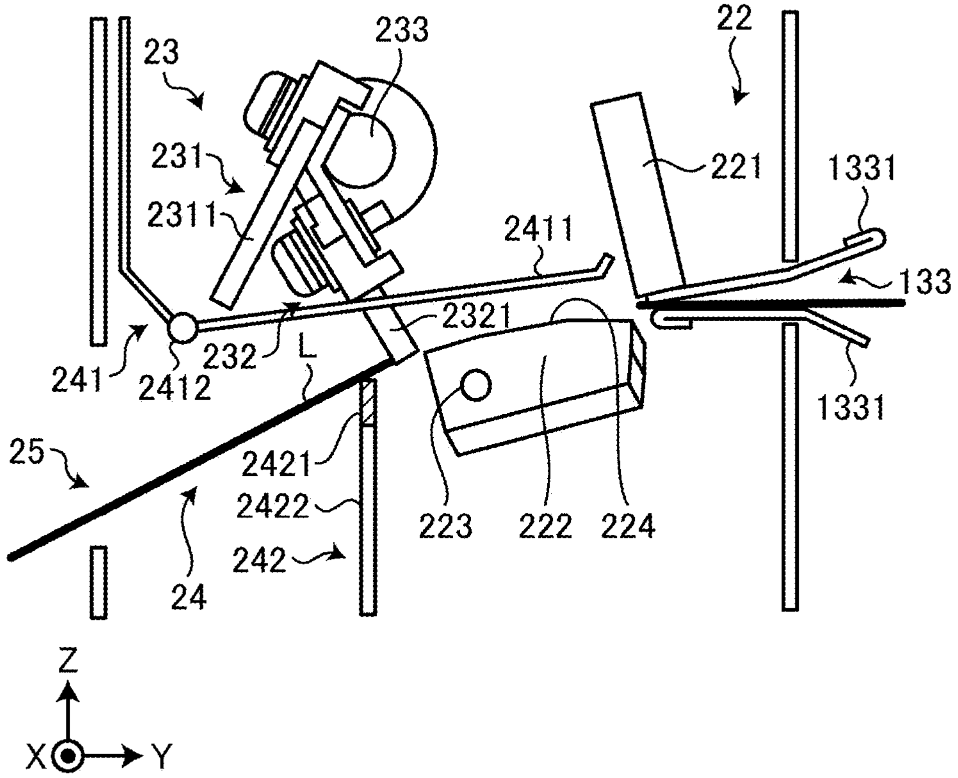
FIG. 14 is a diagram for explaining an operation of the cutting device according to the embodiment.

FIG. 14 is a side view illustrating a state immediately after the second paddle blade 2321 detaches from the upper surface 224 of the movable blade 222. As shown in FIG. 14, the second paddle blade 2321 pushes the trailing end of the cloth label L in the conveyance direction. Thus, in the conveyance unit 23, even when the trailing end of the cloth label L remains on the upper surface 224 after the first paddle blade 2311 detaches from the upper surface 224, the cloth label L can be reliably conveyed in the conveyance direction.

As described above, the cutting device 2 of the present embodiment includes the cutter 22 that includes the fixed blade 221 provided above the conveyance path for conveying the cloth label L and the movable blade 222 provided below the conveyance path. The movable blade 222 is moved upward to cut the cloth label L placed between the movable blade 222 and the fixed blade 221. The cutting device 2 also includes the upper guide 241 that is disposed downstream of the cutter 22 in the conveyance direction and above the conveyance path and guides the cloth label L, which has passed between the fixed blade 221 and the movable blade 222, in the conveyance direction of the conveyance path. The upper guide 241 is movable in the vertical direction in conjunction with the movable blade 222.

Thus, the cutting device 2 can move the upper guide 241 (or the first guide part 2411) up and down in conjunction with the movement of the movable blade 222. Specifically, in the cutting device 2, when the cloth label L conveyed from the printer 1 passes between the fixed blade 221 and the movable blade 222, that is, when the movable blade 222 is in a low position, the first guide part 2411 is moved downward in conjunction with the movable blade 222. This makes it possible to reduce the contact angle at which the tip of the curled cloth label L contacts the first guide part 2411. Therefore, in the cutting device 2, even when the cloth label L is curled, the cloth label L can be efficiently conveyed. Also, in the cutting device 2, when the cloth label Lis cut by the cutter 22, that is, when the movable blade 222 is moved upward, the first guide part 2411 can be moved upward in conjunction with the movement of the movable blade 222 to accommodate the movement range of the cutter 22.

Also, in the cutting device 2, since the cloth label L can be pushed in the conveyance direction by the sweeping operation of the first paddle 231 and the second paddle 232, it is possible to efficiently convey (or discharge) the cut cloth label L. Furthermore, in the cutting device 2, since the operation of cutting the cloth label L and the sweeping operation by the first paddle 231 and the second paddle 232 can be performed in conjunction with each other, a series of steps from the cutting to the discharging can be efficiently performed.

The above-described embodiment can be appropriately modified and implemented by changing some of the configurations or the functions of the printer 1 and the cutting device 2. Variations of the above-described embodiment will be described below. Note that, in the variations below, differences from the above-described embodiment will be mainly described, and detailed descriptions of the same components and features as those described above will be omitted. Also, the variations described below may be implemented individually or in any appropriate combination.

(First Variation)

In the above-described embodiment, the movable blade 222 and the first guide part 2411 are driven by the same drive mechanism 3. However, the present invention is not limited to this example, and the movable blade 222 and the first guide part 2411 may be driven using different drive mechanisms.

(Second Variation)

In the above-described embodiment, for example, the movable blade 222 may be formed of a conductive material such as a metallic material, and the movable blade 222 may be grounded to, for example, the housing 21. This makes it possible to reduce the potential difference resulting from the charging of the cloth label L and thereby makes it possible to more efficiently convey the cloth label L.

(Third Variation)

In the above-described embodiment, the first paddle 231 and the second paddle 232 are used. However, the present invention is not limited to this example, and only the first paddle 231 (or the second paddle 232) may be used. For example, depending on the characteristics of the cloth label L to be used, a single paddle may be used as long as the conveyance of the cloth label L can be performed only by the sweeping operation of the single paddle.

The number of paddles is not limited to two, and three or more paddles may be provided on the paddle rotation shaft 233 depending on the characteristics of the cloth label L to be used. Note that the attachment angles of the paddles to the paddle rotation shaft 233 are different from each other.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A cutting device for cutting a cloth medium, comprising:

a cutter including a fixed blade above a conveyance path along which the cloth medium is conveyed and a movable blade below the conveyance path, the movable blade being movable upward to cut the cloth medium between the fixed blade and the movable blade;

a guide disposed above the conveyance path and downstream of the cutter in a conveyance direction in which the cloth medium is conveyed along the conveyance path, the guide guiding the cloth medium having passed between the fixed blade and the movable blade in the conveyance direction;

a first rotation shaft that is disposed above the conveyance path;

a second rotation shaft that is disposed above the conveyance path and rotates in the conveyance direction; and a paddle that is attached to the second rotation shaft and moves in the conveyance direction along with a rotation of the second rotation shaft to sweep out the cloth medium in the conveyance direction, wherein the guide is movable in a vertical direction in conjunction with the movable blade, the guide includes a plate-like part extending along the conveyance direction, a downstream end of the plate-like part is supported by the first rotation shaft, and the plate-like part is rotatable around the first rotation shaft, and the plate-like part is disposed between an upper surface of the movable blade and the second rotation shaft.

2. The cutting device according to claim 1, wherein an upstream end of the plate-like part is a free end.

3. The cutting device according to claim 1, further comprising:

a first drive mechanism that rotates the plate-like part in conjunction with the movable blade.

4. The cutting device according to claim 1, wherein the plate-like part is formed of a conductive material and is grounded.

5. The cutting device according to claim 1, further comprising:

a lower guide that is disposed below the conveyance path and supports the cloth medium from below, wherein the lower guide includes a static eliminator that removes static electricity from the cloth medium being conveyed.

6. The cutting device according to claim 1, wherein the plate-like part has a window to prevent interference with the paddle.

7. The cutting device according to claim 1, wherein the cutter cuts off a portion of the cloth medium with a predetermined length, and the guide guides the cut-off portion of the cloth medium.

8. The cutting device according to claim 1, wherein the movable blade includes a support shaft and is rotatable around the support shaft.

9. The cutting device according to claim 1, wherein the movable blade is formed of a conductive material and is grounded.

10. A cutting device for cutting a cloth medium, comprising:

a cutter including a fixed blade above a conveyance path along which the cloth medium is conveyed and a movable blade below the conveyance path, the movable blade being movable upward to cut the cloth medium between the fixed blade and the movable blade;

a guide disposed above the conveyance path and downstream of the cutter in a conveyance direction in which the cloth medium is conveyed along the conveyance path, the guide guiding the cloth medium having passed between the fixed blade and the movable blade in the conveyance direction;

a platform on which a portion of the cloth medium cut off by the cutter is placeable;

a rotation shaft above the conveyance path; and at least one paddle that is attached to the rotation shaft and contacts the platform when the rotation shaft is rotated, wherein the guide is movable in a vertical direction in conjunction with the movable blade.

11. The cutting device according to claim 10, wherein the platform is an upper surface of the movable blade.

12. The cutting device according to claim 10, wherein the at least one paddle sweeps out the cloth medium in the conveyance direction when the rotation shaft is rotated.

13. The cutting device according to claim 10, wherein the at least one paddle includes a paddle blade that contacts the platform, and the paddle blade is formed of an elastic material.

14. The cutting device according to claim 10, wherein the at least one paddle comprises a first paddle and a second paddle that are attached to the rotation shaft at different attachment angles such that, when the rotation shaft is rotated, the first paddle contacts the platform first and then the second paddle contacts the platform.

15. The cutting device according to claim 14, wherein a difference between the attachment angles of the first paddle and the second paddle is adjustable depending on a type of the cloth medium.

16. The cutting device according to claim 14, wherein the first paddle includes a first paddle blade that contacts the platform, the second paddle includes a second paddle blade that contacts the platform, and the second paddle blade is longer than the first paddle blade.

17. The cutting device according to claim 10, further comprising:

a second drive mechanism that rotates the rotation shaft in conjunction with a rotation of the movable blade.

18. A printer comprising:

a printing mechanism configured to perform printing on a cloth medium;

a cutter including a fixed blade above a conveyance path along which the cloth medium is conveyed and a movable blade below the conveyance path, the movable blade being movable upward to cut the cloth medium between the fixed blade and the movable blade;

a guide disposed above the conveyance path and downstream of the cutter in a conveyance direction in which the cloth medium is conveyed along the conveyance path, the guide guiding the cloth medium having passed between the fixed blade and the movable blade in the conveyance direction;

a first rotation shaft that is disposed above the conveyance path;

a second rotation shaft that is disposed above the conveyance path and rotates in the conveyance direction; and a paddle that is attached to the second rotation shaft and moves in the conveyance direction along with a rotation of the second rotation shaft to sweep out the cloth medium in the conveyance direction, wherein the guide is movable in a vertical direction in conjunction with the movable blade, the guide includes a plate-like part extending along the conveyance direction, a downstream end of the plate-like part is supported by the first rotation shaft, and the plate-like part is rotatable around the first rotation shaft, and the plate-like part is disposed between an upper surface of the movable blade and the second rotation shaft.

* * * * *